United States Patent
Ohashi et al.

[11] Patent Number: 5,294,487
[45] Date of Patent: Mar. 15, 1994

[54] COMPOSITE LAYERED MATERIAL CONTAINING A SILICONE RESIN SUBSTRATE

[75] Inventors: Kazuhiko Ohashi, Akatokiwa; Sunao Fukutake, Okayama, both of Japan

[73] Assignee: Japan Gore-Tex, Inc., Tokyo, Japan

[21] Appl. No.: 16,481

[22] Filed: Feb. 10, 1993

Related U.S. Application Data

[62] Division of Ser. No. 952,116, Sep. 28, 1992, abandoned.

[30] Foreign Application Priority Data

Sep. 30, 1991 [JP] Japan .................. 3-251961

[51] Int. Cl.$^5$ .................. B32B 5/18; B32B 27/00
[52] U.S. Cl. .................. 428/308.4; 428/317.1; 428/317.7; 428/421; 428/447
[58] Field of Search .............. 428/306.6, 308.4, 317.1, 428/317.7, 421, 447, 315.5, 422; 156/329

[56] References Cited

U.S. PATENT DOCUMENTS

| | | | |
|---|---|---|---|
| 3,486,961 | 12/1969 | Adams | 156/306.6 |
| 3,607,604 | 4/1975 | Nava | 428/312.2 |
| 3,874,986 | 9/1971 | Browall et al. | 428/315.9 |
| 4,194,041 | 3/1980 | Gore et al. | 428/422 |
| 4,350,734 | 9/1982 | Hammond | 428/308.4 |
| 4,681,808 | 7/1987 | Lefler, III | 428/425.5 |
| 5,024,594 | 6/1991 | Athayde et al. | 428/422 |

FOREIGN PATENT DOCUMENTS 57-81805  5/1982  Japan .................. 428/422

OTHER PUBLICATIONS

JP-A-61 149 226 (Agency of Ind. Sci. Tech.) Jul. 7, 1986 Abstract.
JP-A-2 237 627 (Matsushita Elec. Ind. KK) Sep. 20, 1990 Abstract.
JP-A-2 222 718 (Matsushita Elec. Ind. KK) Sep. 5, 1990 Abstract.

Primary Examiner—George F. Lesmes
Assistant Examiner—Christopher Brown
Attorney, Agent, or Firm—Gary A. Samuels

[57] ABSTRACT

A composite material comprising a porous polymeric material bonded to a silicone resin substrate with a silicone-based adhesive agent, wherein only part of the pores of said porous material in the thickness direction thereof contain said silicone-based adhesive agent.

3 Claims, 3 Drawing Sheets

COMPOSITE LAYERED MATERIAL CONTAINING A SILICONE RESIN SUBSTRATE

This application is a division, of application Ser. No. 07/952,116 filed Sep. 28, 1992, now abandoned.

FIELD OF THE INVENTION

The present invention relates to a composite material containing a silicone resin substrate.

BACKGROUND OF THE INVENTION

Silicone resins can be used under high temperatures of over 200° C. They also have good chemical resistance. Their gas permeability is also extremely high, their electrical characteristics are excellent, and they also have excellent biocompatibility.

In general, when a silicone resin is bonded to another material, the only option is to bond it using a silicone-based adhesive agent. However, silicone-based adhesive agents are not universally applicable, e.g., they have extremely poor compatibility with urethane resins and vinyl chloride-based resins, resulting in poor adhesive strength. A low-temperature plasma treatment step, or a primer treatment can be performed, or some other method employed, to augment adhesive strength, but satisfactory adhesive strength has still yet to be obtained.

Furthermore, silicone resins have good release properties; but because of that, bonding a silicone resin with another plastic, with an adhesive not based on a silicone resin, or coating a silicone resin with another resin, is extremely difficult.

Methods for compounding silicone composition have therefor been proposed; however, the compounding conditions vary depending on the resin being compounded and other factors, and an inordinate number of steps is required.

SUMMARY OF THE INVENTION

The present invention is a composite layered material in which adhesive properties are imparted to a silicone resin substrate while retaining the excellent characteristics inherent to silicone resins, so that the silicone resin substrate can be bonded with any resin, glass, ceramic, metal, or composite material of these, or can be coated with another resin.

In one aspect, the present invention comprises a porous material bonded to a silicone resin substrate by means of a silicone-based adhesive, wherein only part of the pores of the porous material in the thickness direction thereof contains the adhesion.

In another aspect the present invention comprises a silicone resin substrate bonded or coated with another resin, glass, ceramic, metal, or composite material thereof, by means of the porous material interposed between the two materials.

DETAILED DESCRIPTION OF THE INVENTION

Figure 1:
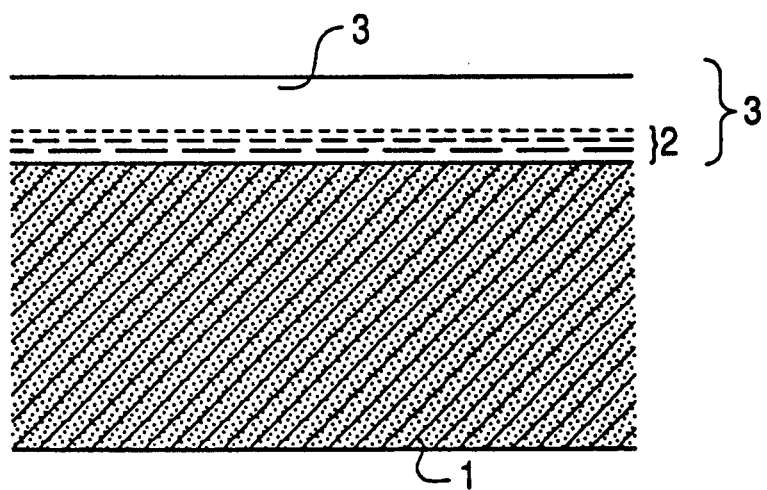
FIG. 1 is a cross section of the composite material of Example 1.

The silicone resin substrate is a substrate that is either composed of a silicone resin or contains a silicone resin. There are no restrictions on the shape of this substrate, which may be a sheet, a tube, or a rod, and may also be a substrate in which a porous fluororesin is used as a structural support material, and is impregnated with a silicone resin. Obviously, the present invention can also be similarly applied to a fluorosilicone resin that contains fluorine, for example. A preferred resin is polydimethyl siloxane The porous material used in the present invention needs to be porous, but there are no particular restrictions on the pore diameter.

Materials having a favorable porous structure are porous fluororesins, porous polyethylenes, and porous polypropylenes. Of these, porous materials that can be used to particularly good advantage are those composed of expanded polytetrafluoroethylene. This type of material is discussed in detail in U.S. Pat. No. 4,187,390. Moreover, since polytetrafluoroethylene materials have heat resistance of 260° C. or higher, are impervious to most chemicals, and have excellent electrical characteristics, these excellent characteristics of silicone resin substrates will not be sacrificed. Polytetrafluoroethylene materials also have extremely good adhesion when used with an adhesive agent.

The bonding of the silicone resin substrate and the porous material is performed using a known silicone-based adhesive agent. The use of a silicone-based adhesive agent is possible because this bonding involves impregnation with the adhesive agent from the porous material side.

In bonding with this silicone-based adhesive agent, only a portion of the porous material (in the thickness direction thereof) is impregnated with the adhesive agent, and open pores are left in the remaining portion of the thickness. A composite material obtained in this manner is itself useful, but it is also possible to bond a second member as desired by utilizing the remainder of the porous material.

The second member may be a resin, glass, ceramic, metal, wood, etc., or a composite material of these.

The adhesive agent that is used to bond the second member to the porous material should be appropriately selected according to the second member.

The compounding of the silicone resin and the other material is accomplished by first bonding the silicone resin and the porous material together with the silicone-based adhesive agent. The silicone-based adhesive agent is not permitted to impregnate the entire thickness of the porous material, and most importantly, the silicone-based adhesive agent is not permitted to adhere over the surface of the other side of the porous material Therefore, that side can be used with any adhesive agent, and the porous material side can also be coated with the second member. The reason for not allowing any silicone-based adhesive agent does adhere, the release properties will be extremely strong in that area, resulting in peeling in actual practice.

The resin that is used to coat the other side of the porous material can be a fluororesin, an epoxy resin, a urethane resin, an acrylic resin, or the like, as dictated by the intended application, but the use of a fluororesin is preferable from the standpoint of taking advantage of the characteristics of the silicone resin that serves as the substrate.

Applications of the composite material of the present invention include gas selective permeable membranes, laminates of materials with high and low coefficients of friction, materials with heat sealing properties (silicone resins have no heat sealing properties), printable silicone resins (silicone resins are extremely difficult to print), and the like, although this list is not comprehensive.

Practical Examples

Practical examples will now be given while referring to the figures.

PRACTICAL EXAMPLE 1

Referring to FIG. 1, a suitable amount of polydimethyl siloxane adhesive sealant 2 (SE9156 Clear, made by Toray-Dow Corning Silicone) was applied in drops to a silicone sheet 1 with a thickness of 2 mm and a high gas permeability (Ficon stock number 140C, made by Fuji Systems), over which was applied a porous polytetrafluoroethylene material 3 with a thickness of 40 $\mu$m and a pore diameter of about 0.2 $\mu$m average (made by Japan GORE-TEX, Inc.). Here, the silicone adhesive sealant did not impregnate all the way through the thickness of the porous polytetrafluoroethylene. This composite was allowed to stand for approximately 24 hours at ambient temperature to cure the silicone adhesive sealant.

Practical Example 2

Figure 2:
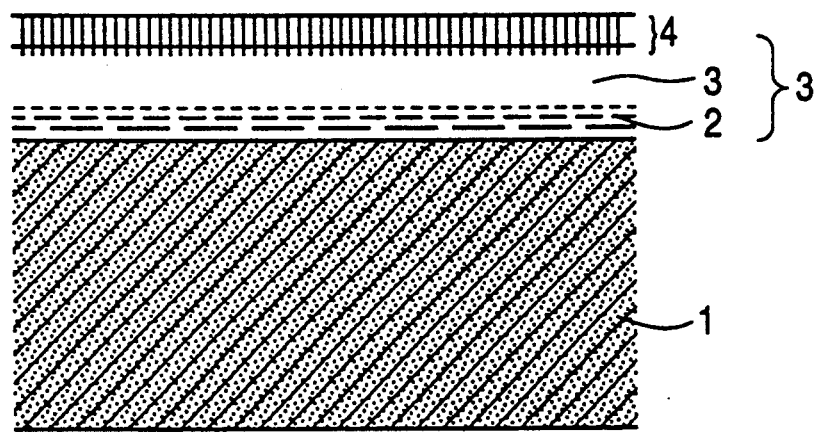
FIG. 2 is a cross section of the composite material of Example 2.

Referring to FIG. 2, the porous polytetrafluoroethylene side of the substrate created in Practical Example 1 was coated with a solution obtained by dissolving an amorphous fluororesin 4 (Teflon AF2400, may by DuPont, a hydrogen selective permeable resin) in a solvent (Fluorinate, made by 3M) in a concentration of 2 wt % such that the coating thickness would be 10 $\mu$m. This substrate was cured for approximately three hours at 100° C. to produce a hydrogen selective permeable membrane.

Practical Example 3

Since silicone resins also have excellent electrical characteristics, a copper foil was laid over a silicone resin to produce a printed circuit board.

A 35 $\mu$m electrolytic copper foil was bonded over the porous polytetrafluoroethylene side of the substrate created in Practical Example 1 using an epoxy resin as the adhesive agent.

In this case, the substrate was one-sided, but, naturally, a two-sided substrate could also be used.

Practical Example 4

Figure 3:
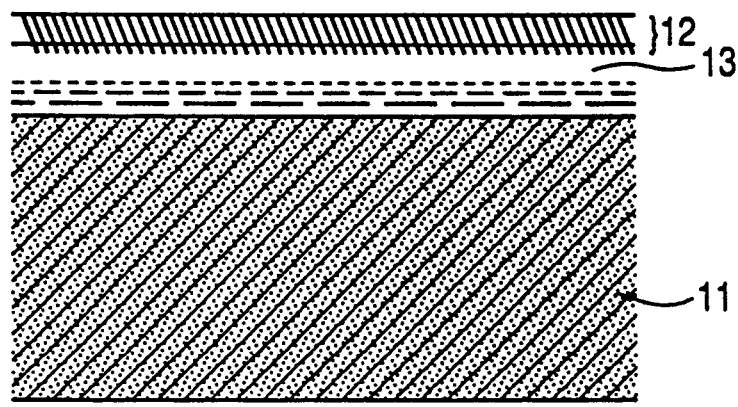
FIG. 3 is a cross section of the printed wiring board of Example 4.

Referring to FIG. 3, a porous polytetrafluoroethylene material 13 with a thickness of 40 $\mu$m and a pore diameter of 0.2 $\mu$m (made by Japan GORE-TEX, Inc.) which had been plated on one side with copper 12 was applied to a silicone resin 11 with a thickness of 1 mm using the above-mentioned silicone-based adhesive agent 14, thereby producing a one-sided substrate.

Utility

Figure 4:
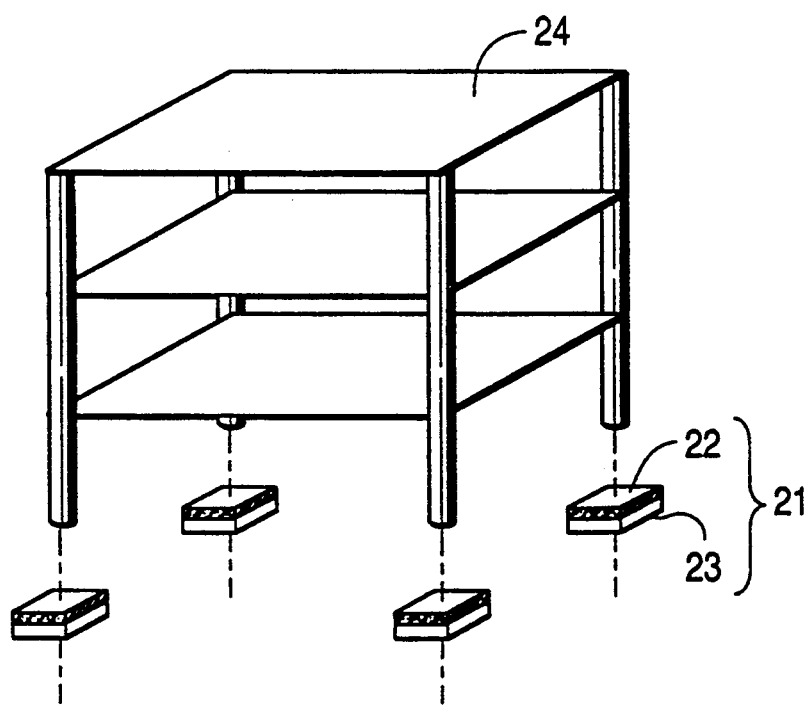
FIG. 4 is an oblique view of the heavy shelf used in Reference Example 1.

Referring to FIG. 4, the laminated material 21 from Practical Example 1 was cut into squares of approximately 20 cm, and these were placed between the floor and all four legs of the heavy shelf 24 (weight: approximately 100 kg). The squares were inserted such that the silicone resin 22 side faced the legs of the shelf, and the porous polytetrafluoroethylene material 23 side faced the floor.

When the composite material was inserted, the heavy shelf could be removed with an extremely slight force of approximately 30 kg (i.e. by one person), but when the composite material was not inserted, the shelf could not be moved satisfactorily even with a force of approximately 150 kg. Moreover, the floor was deeply scratched the instant the shelf was moved.

The silicone resin side of this composite material clung fast to the legs of the shelf, while the porous polytetrafluoroethylene material slid along the floor because of its extremely low coefficient of friction, and consequently, this composite material did not come off during movement of the shelf, and the floor was not scratched.

The flooring in this test was concrete.

Electrolytic capacitors are used in huge numbers nowadays as electronic components in televisions, radios, etc. One of the technological problems with electrolytic capacitors is the release of internally generated hydrogen gas.

Hydrogen gas is generated when these devices are used under supervoltage and high temperatures, used continuously for extended periods of time, used with improper positive-negative connection, etc., and it is extremely hazardous for the internal hydrogen pressure to rise too high, and there can be an explosion even if a safety valve is installed.

Ethylene glycol is often used as the electrolyte inside electrolytic capacitors. Accordingly, there is a need for a membrane that will allow hydrogen to pass through but not ethylene glycol vapor. At the same time, this membrane must have heat resistance of 200° C. or higher since it is exposed to heat during soldering and other such work.

Figure 5:
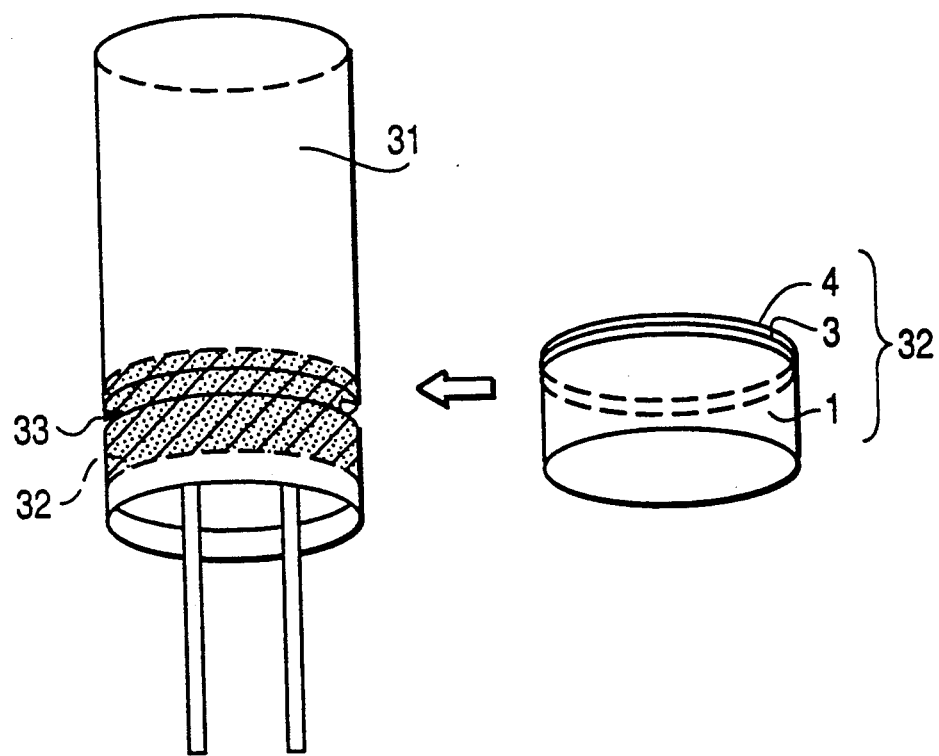
FIG. 5 is a diagram of the electrolytic capacitor used in Reference Example 2.

Thereupon, the substrate 32 for Practical Example 2 was cut into a circle 7 mm in diameter and put at the bottom of an electrolytic capacitor 31, as shown in FIG. 5. In the figure, 33 is a groove used for sealing.

No swelling due to hydrogen gas occurred when this electrolytic capacitor was used at 100° C. for 100 hours under an applied voltage of 10 V, and, naturally, there was no explosion or other such occurrence. Neither was there any drying up of the electrolyte (ethylene glycol), which means that the ethylene glycol vapor did not pass through the membrane.

Meanwhile, when an electrolytic capacitor having a conventional structure (one in which solid polytetrafluoroethylene was used in place of the substrate from Practical Example 2) was used under the above conditions, swelling occurred as a result of hydrogen gas.

We claim:

1. A composite material comprising a layer of porous polymeric material having pores extending through the thickness of the layer, and being bonded to a layer of a silicone resin substrate by means of a silicone-based adhesive agent, wherein only part of the pores of said porous material in the thickness direction thereof contain said silicone-based adhesive agent; said layer or porous polymeric material having on its surface opposite the silicone resin substrate, a resin coating selected from the group consisting of fluororesin, epoxy resin, urethane resin and acrylic resin.

2. The composite material of claim 1 wherein the porous polymeric material is selected from the class consisting of a porous fluororesin, a porous polyethylene, and a porous polypropylene.

3. The composite material of claim 1 wherein the porous polymeric material is porous polytetrafluoroethylene.

* * * * *